US008239350B1

(12) United States Patent
Vespe et al.

(10) Patent No.: US 8,239,350 B1
(45) Date of Patent: Aug. 7, 2012

(54) DATE AMBIGUITY RESOLUTION

(75) Inventors: David Vespe, New York, NY (US);
Andrew W. Hogue, Ho Ho Kus, NJ (US)

(73) Assignee: Google Inc., Mountain View, CA (US)

( * ) Notice: Subject to any disclaimer, the term of this patent is extended or adjusted under 35 U.S.C. 154(b) by 576 days.

(21) Appl. No.: 11/745,605

(22) Filed: May 8, 2007

(51) Int. Cl.
*G06F 7/00* (2006.01)

(52) U.S. Cl. ..................................................... 707/687

(58) Field of Classification Search .................. None
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | 395/600 |
| 5,440,730 A | 8/1995 | Elmasri et al. | 395/600 |
| 5,475,819 A | 12/1995 | Miller et al. | |
| 5,519,608 A | 5/1996 | Kupiec | 364/419.08 |
| 5,560,005 A | 9/1996 | Hoover et al. | |
| 5,574,898 A | 11/1996 | Leblang et al. | |
| 5,680,622 A | 10/1997 | Even | 395/709 |
| 5,694,590 A | 12/1997 | Thuraisingham et al. | 395/600 |
| 5,701,470 A | 12/1997 | Joy et al. | 395/614 |
| 5,717,911 A | 2/1998 | Madrid et al. | 395/602 |
| 5,717,951 A | 2/1998 | Yabumoto | 395/831 |
| 5,724,571 A | 3/1998 | Woods | |
| 5,778,378 A | 7/1998 | Rubin | 707/103 |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 395/200.48 |
| 5,815,415 A | 9/1998 | Bentley et al. | 364/578 |
| 5,819,210 A | 10/1998 | Maxwell, III et al. | 704/9 |
| 5,819,265 A | 10/1998 | Ravin et al. | 707/5 |
| 5,822,743 A | 10/1998 | Gupta et al. | 706/50 |

(Continued)

FOREIGN PATENT DOCUMENTS

JP 5-174020 A 7/1993

(Continued)

OTHER PUBLICATIONS

Dean, Thomas et al., Using Design Recovery Techniques to Transform Legacy Systems, Proceedings IEEE Conf. on Software Maintenance, pp. 622-631, Nov. 2001.*

(Continued)

*Primary Examiner* — Christyann Pulliam
(74) *Attorney, Agent, or Firm* — Morgan, Lewis & Bockius LLP

(57) ABSTRACT

A system and method for resolving ambiguities in date values associated with an attribute in a memory of the computer system. If a first text string conforms to one or more date formats, a confidence value is assigned for each of the date formats for the first text string based on the amount of specificity with which the first text string conforms to each date format. Similarly, if a second text string conforms to one or more date formats, a confidence value is assigned for each of the date formats for the second text string based on the amount of specificity with which the second text string conforms to each date format. The date format with the highest confidence value for the first text string and the date format with the highest confidence value for the second text string are merged to obtain a date value for the attribute.

59 Claims, 10 Drawing Sheets

U.S. PATENT DOCUMENTS

| | | | |
|---|---|---|---|
| 5,826,258 A | 10/1998 | Gupta et al. | 707/4 |
| 5,838,979 A * | 11/1998 | Hart et al. | 717/146 |
| 5,909,689 A | 6/1999 | Van Ryzin | 707/203 |
| 5,920,859 A | 7/1999 | Li | 707/5 |
| 5,943,670 A | 8/1999 | Prager | 707/5 |
| 5,956,718 A | 9/1999 | Prasad et al. | 707/10 |
| 5,974,254 A | 10/1999 | Hsu | 395/703 |
| 5,987,460 A | 11/1999 | Niwa et al. | 707/6 |
| 6,018,741 A | 1/2000 | Howland et al. | 707/102 |
| 6,044,366 A | 3/2000 | Graffe et al. | 707/2 |
| 6,052,693 A | 4/2000 | Smith et al. | 707/104 |
| 6,078,918 A | 6/2000 | Allen et al. | 707/6 |
| 6,112,203 A | 8/2000 | Bharat et al. | 707/5 |
| 6,112,210 A | 8/2000 | Nori et al. | 707/103 |
| 6,122,647 A | 9/2000 | Horowitz et al. | 707/513 |
| 6,134,555 A | 10/2000 | Chadha et al. | 707/102 |
| 6,138,270 A | 10/2000 | Hsu | 717/3 |
| 6,182,063 B1 | 1/2001 | Woods | |
| 6,212,526 B1 | 4/2001 | Chaudhuri et al. | 707/102 |
| 6,240,546 B1 * | 5/2001 | Lee et al. | 717/131 |
| 6,263,328 B1 | 7/2001 | Coden et al. | 707/3 |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 | 5/2002 | Lamburt et al. | 707/203 |
| 6,438,543 B1 | 8/2002 | Kazi et al. | |
| 6,473,898 B1 | 10/2002 | Waugh et al. | 717/168 |
| 6,502,102 B1 | 12/2002 | Haswell | 707/102 |
| 6,556,991 B1 | 4/2003 | Borkovsky | 707/6 |
| 6,567,936 B1 | 5/2003 | Yang et al. | 714/37 |
| 6,572,661 B1 | 6/2003 | Stern | 715/501.1 |
| 6,584,464 B1 | 6/2003 | Warthen | 707/4 |
| 6,594,658 B2 | 7/2003 | Woods | |
| 6,606,625 B1 | 8/2003 | Muslea et al. | 707/6 |
| 6,606,659 B1 | 8/2003 | Hegli et al. | 709/225 |
| 6,609,123 B1 | 8/2003 | Cazemier et al. | 707/4 |
| 6,656,991 B2 | 12/2003 | Staccione et al. | 524/430 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 715/501.1 |
| 6,745,189 B2 | 6/2004 | Schreiber | 707/10 |
| 6,754,873 B1 | 6/2004 | Law et al. | 715/501.1 |
| 6,799,176 B1 | 9/2004 | Page | 707/5 |
| 6,804,667 B1 | 10/2004 | Martin | 707/6 |
| 6,820,081 B1 | 11/2004 | Kawai et al. | 707/7 |
| 6,820,093 B2 * | 11/2004 | de la Huerga | 707/687 |
| 6,823,495 B1 | 11/2004 | Vedula et al. | 715/805 |
| 6,850,896 B1 | 2/2005 | Kelman et al. | 705/10 |
| 6,886,005 B2 | 4/2005 | Davis | 707/2 |
| 6,901,403 B1 | 5/2005 | Bata et al. | 707/101 |
| 6,957,213 B1 | 10/2005 | Yuret | 707/4 |
| 6,963,880 B1 | 11/2005 | Pingte et al. | 707/103 R |
| 7,003,522 B1 | 2/2006 | Reynar et al. | 707/10 |
| 7,003,719 B1 | 2/2006 | Rosenoff et al. | 715/500.1 |
| 7,020,662 B2 | 3/2006 | Boreham et al. | 707/104.1 |
| 7,051,023 B2 | 5/2006 | Kapur et al. | 707/5 |
| 7,080,073 B1 | 7/2006 | Jiang et al. | 707/7 |
| 7,080,085 B1 | 7/2006 | Choy et al. | 707/101 |
| 7,143,099 B2 * | 11/2006 | Lecheler-Moore et al. | 707/101 |
| 7,146,536 B2 | 12/2006 | Bingham, Jr. et al. | 714/26 |
| 7,162,499 B2 | 1/2007 | Lees et al. | 707/203 |
| 7,194,380 B2 | 3/2007 | Barrow et al. | 702/181 |
| 7,197,449 B2 | 3/2007 | Hu et al. | 704/9 |
| 7,277,879 B2 | 10/2007 | Varadarajan | 707/1 |
| 7,305,380 B1 | 12/2007 | Hoelzle et al. | 707/3 |
| 7,363,312 B2 | 4/2008 | Goldsack | 707/102 |
| 7,472,182 B1 | 12/2008 | Young et al. | 709/224 |
| 7,483,829 B2 | 1/2009 | Murakami et al. | 704/10 |
| 7,493,317 B2 | 2/2009 | Geva | 707/3 |
| 7,747,571 B2 * | 6/2010 | Boggs | 707/613 |
| 7,797,282 B1 | 9/2010 | Kirshenbaum et al. | 707/651 |
| 7,953,720 B1 | 5/2011 | Rohde et al. | |
| 8,065,290 B2 | 11/2011 | Hogue | |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 | 6/2002 | Davis | 707/500.1 |
| 2002/0083039 A1 | 6/2002 | Ferrari et al. | 707/1 |
| 2002/0087567 A1 | 7/2002 | Spiegler et al. | 707/100 |
| 2002/0147738 A1 | 10/2002 | Reader | 707/500 |
| 2002/0169770 A1 | 11/2002 | Kim et al. | 707/5 |
| 2002/0178448 A1 | 11/2002 | Te Kiefte et al. | 725/46 |
| 2002/0194172 A1 | 12/2002 | Schreiber | 707/4 |
| 2003/0018652 A1 | 1/2003 | Heckerman et al. | 707/104.1 |
| 2003/0058706 A1 | 3/2003 | Okamoto et al. | 365/200 |
| 2003/0078902 A1 | 4/2003 | Leong et al. | 706/59 |
| 2003/0120644 A1 | 6/2003 | Shirota | 707/3 |
| 2003/0120675 A1 | 6/2003 | Stauber et al. | 707/100 |
| 2003/0126102 A1 | 7/2003 | Borthwick | 706/21 |
| 2003/0149567 A1 | 8/2003 | Schmitz et al. | 704/270 |
| 2003/0154071 A1 | 8/2003 | Shreve | 704/9 |
| 2003/0177110 A1 | 9/2003 | Okamoto et al. | 707/3 |
| 2003/0182310 A1 | 9/2003 | Charnock et al. | 707/104.1 |
| 2003/0195877 A1 | 10/2003 | Ford et al. | 707/3 |
| 2003/0196052 A1 | 10/2003 | Bolik et al. | 711/162 |
| 2004/0003067 A1 | 1/2004 | Ferrin | 709/223 |
| 2004/0024739 A1 | 2/2004 | Copperman et al. | 707/1 |
| 2004/0064447 A1 | 4/2004 | Simske et al. | 707/5 |
| 2004/0088292 A1 | 5/2004 | Dettinger et al. | 707/4 |
| 2004/0107125 A1 | 6/2004 | Guheen et al. | 705/7 |
| 2004/0122844 A1 | 6/2004 | Malloy et al. | 707/102 |
| 2004/0123240 A1 * | 6/2004 | Gerstl et al. | 715/513 |
| 2004/0128624 A1 | 7/2004 | Arellano et al. | 715/530 |
| 2004/0143600 A1 | 7/2004 | Musgrove et al. | 707/104.1 |
| 2004/0153456 A1 | 8/2004 | Charnock et al. | 707/10 |
| 2004/0167870 A1 | 8/2004 | Wakefield et al. | 707/1 |
| 2004/0177015 A1 | 9/2004 | Galai et al. | 705/35 |
| 2004/0199923 A1 | 10/2004 | Russek | 719/310 |
| 2004/0255237 A1 | 12/2004 | Tong | 715/501.1 |
| 2004/0260979 A1 | 12/2004 | Kumai | 714/37 |
| 2004/0267700 A1 | 12/2004 | Dumais et al. | 707/2 |
| 2005/0076012 A1 | 4/2005 | Manber et al. | 707/3 |
| 2005/0086211 A1 | 4/2005 | Mayer | 707/3 |
| 2005/0086222 A1 | 4/2005 | Wang et al. | 707/5 |
| 2005/0097150 A1 | 5/2005 | McKeon et al. | 707/202 |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone | 707/3 |
| 2005/0240615 A1 | 10/2005 | Barsness et al. | 707/102 |
| 2005/0256825 A1 | 11/2005 | Dettinger et al. | 707/1 |
| 2006/0036504 A1 | 2/2006 | Allocca et al. | 705/26 |
| 2006/0041597 A1 | 2/2006 | Conrad et al. | 707/200 |
| 2006/0047838 A1 | 3/2006 | Chauhan | 709/230 |
| 2006/0053171 A1 | 3/2006 | Eldridge et al. | 707/203 |
| 2006/0053175 A1 | 3/2006 | Gardner et al. | 707/203 |
| 2006/0074824 A1 | 4/2006 | Li | 706/20 |
| 2006/0074910 A1 | 4/2006 | Yun et al. | 707/7 |
| 2006/0085465 A1 | 4/2006 | Nori et al. | 707/101 |
| 2006/0136585 A1 | 6/2006 | Mayfield et al. | 709/224 |
| 2006/0143227 A1 | 6/2006 | Helm et al. | 707/103 |
| 2006/0143603 A1 | 6/2006 | Kalthoff et al. | 717/172 |
| 2006/0152755 A1 | 7/2006 | Curtis et al. | 358/1.15 |
| 2006/0167991 A1 * | 7/2006 | Heikes et al. | 709/204 |
| 2006/0238919 A1 | 10/2006 | Bradley | 360/128 |
| 2006/0248045 A1 | 11/2006 | Toledano et al. | 707/2 |
| 2006/0248456 A1 * | 11/2006 | Bender et al. | 715/531 |
| 2006/0253418 A1 | 11/2006 | Charnock et al. | 707/1 |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 |
| 2007/0016890 A1 | 1/2007 | Brunner et al. | 717/107 |
| 2007/0038610 A1 | 2/2007 | Omoigui | 707/3 |
| 2007/0073768 A1 | 3/2007 | Goradia | 707/104.1 |
| 2007/0094246 A1 * | 4/2007 | Dill et al. | 707/4 |
| 2007/0130123 A1 | 6/2007 | Majumder | 707/3 |
| 2007/0143317 A1 | 6/2007 | Hogue et al. | 707/100 |
| 2007/0150800 A1 | 6/2007 | Betz et al. | 715/500 |
| 2007/0198480 A1 | 8/2007 | Hogue et al. | 707/3 |
| 2007/0203867 A1 | 8/2007 | Hogue et al. | 706/48 |
| 2007/0271268 A1 | 11/2007 | Fontoura et al. | 707/6 |

| | | | |
|---|---|---|---|
| 2008/0071739 | A1 | 3/2008 | Kumar et al. ............... 707/3 |
| 2008/0104019 | A1 | 5/2008 | Nath |
| 2009/0006359 | A1 | 1/2009 | Liao ........................... 707/5 |

FOREIGN PATENT DOCUMENTS

| | | |
|---|---|---|
| JP | 11-265400 A | 9/1999 |
| JP | 2002-157276 A | 5/2002 |
| JP | 2002-540506 A | 11/2002 |
| JP | 2003-281173 A | 10/2003 |
| WO | WO 01/27713 | 4/2001 |
| WO | WO 2004/114163 | 12/2004 |
| WO | WO 2006/104951 | 10/2006 |

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.
Brill, E., et al., "An Analysis of the AskMSR Question-Answering System," Proceedings of the Conference of Empirical Methods in Natural Language Processing (EMNLP), Jul. 2002, pp. 257-264.
Brin, S., Extracting Patterns and Relations from the World Wide Web, 1999, 12 pages.
Brin, S., et al., "The Anatomy of a Large-Scale Hypertextual Web Search Engine," 7th Int'l World Wide Web Conference, Brisbane, Australia, Apr. 14-18, 1998, pp. 1-26.
Bunescu, R., et al., "Using Encyclopedia Knowledge for Named Entity Disambiguation," Department of Computer Sciences, University of Texas, retrieved from internet Dec. 28, 2006, 8 pages.
Chang, C., et al., "IEPAD: Information Extraction Based on Pattern Discovery," WWW 10 '01, ACM, May 1-5, 2001, pp. 681-688.
Chu-Carroll, J., et al., "A Multi-Strategy and Multi-Source Approach to Question Answering," 2006, 8 pages.
Craswell, N., et al., "Effective Site Finding using Link Anchor Information," SIGIR '01, Sep. 9-12, 2001, pp. 250-257.
Dean, J., et al.., "MapReduce: Simplified Data Processing on Large Clusters," OSDI, 2004, pp. 1-13.
Dong, X., et al., "Reference Reconciliation in Complex Information Spaces," SIGACM-SIGMOD, 2005, 12 pages.
Downey, D., et al., "Learning Text Patterns for Web Information Extraction and Assessment," American Association for Artificial Intelligence, 2002, 6 pages.
Etzioni, O., et al., "Web-scale Information Extraction in KnowItAll (Preliminary Results)," WWW2004, ACM May 17-20, 2004, 11 pages.
Freitag, D., et al., "Boosted Wrapper Induction," American Association for Artificial Intelligence, 2000, 7 pages.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gray, R.M., "Entropy and Information Theory," Springer-Verlag, New York, NY, 1990, pp. 17-46.
Guha, R., "Object Co-Identification on the Semantic Web," WWW2004, ACM, May 17-22, 2004, 9 pages.
Guha, R., et al., "Disambiguating People in Search," World Wide Web Conference, May 17-22, 2004, 9 pages.
Haveliwala, T.H., "Topic-Sensitive PageRank," Proceeding of the 11th Int'l World Wide Web Conference, Honolulu, Hawaii, May 7-11, 2002, pp. 1-23.
Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.
"Information Entropy," Wikipedia, the Free Encyclopedia, Retrieved on May 3, 2006, pp. 1-9.
"Information Theory," Wikipedia, the Free Encyclopedia,: Retrieved on May 3, 2006, pp. 1-12.
International Search Report and Written Opinion for International Application No. PCT/US2007/61156, mailed Feb. 11, 2008, 7 pages.
International Search Report and Written Opinion for International Application No. PCT/US2006/019807, mailed Dec. 18, 2006, 4 pages.
International Search Report and Written Opinion for International Application No. PCT/US2006/07639, mailed Sep. 13, 2006, 6 pages.
Jeh, G., et al., "Scaling Personalized Web Search," Proceedings of the 12th Int'l World Wide Web Conference, Budapest, Hungary, May 20-24, 2003, pp. 1-24.
Ji, H., et al., "Re-Ranking Algorithms for Name Tagging," Workshop on Computationally Hard Problems and Joint Inference in Speech and Language Processing, Jun. 2006, 8 pages.
Jones, R., et al., Bootstrapping for Text Learning Tasks, 1999, 12 pages.
Kolodner, J., "Indexing and Retrieval Strategies for Natural Language Fact Retrieval," ACM Trans. Database Syst. 8.3., Sep. 1983, 434-464.
Kosseim, L., et al., "Answer Formulation for Question-Answering," 11 pages, Oct. 1, 2007.
Liu, B. et al., "Mining Data Records in Web Pages," Conference 2000, ACM, 2000, pp. 1-10.
MacKay, D.J.C., "Information Theory, Inference and Learning Algorithms," Cambridge University Press, 2003, pp. 22-33, 138-140.
Mann, G. et al., "Unsupervised Personal Name Disambiguation," Proceedings of the Seventy Conference on Natural Language Learning at HLT-NAACL, 2003, 8 pages.
McCallum, A., et al., "Object Consolidation by Graph Partitioning with a Conditionally-Trained Distance Metric, " SIGKDD 03, ACM, Aug. 24-27, 2003, 6 pages.
Mihalcea, R., et al., PageRank on Semantic Networks, with Application to Word Sense Disambiguation, Proceedings of the 20th International Conference on Computational Linguistics, Aug. 23-27, 2004, 7 pages.
Mihalcea, R., et al., "TextRank: Bringing Order into Texts," Proceedings of the Conference on Empirical Methods in Natural Language Processing, Jul. 2004, 8 pages.
Page, L., et al., "The PageRank Citation Ranking: Bringing Order to the Web," Stanford Digital Libraries Working Paper, 1998, pp. 1-17.
Pawson, D., "Sorting and Grouping," www.dpawson.co.uk/xsl/sect2/N6280.html>, Feb. 7, 2004, pp. 1-19.
Prager, J. et al., "IBM's Piquant in TREC2003," 2003, 10 pages.
Prager, J., et al., "Question Answering Using Constraint Satisfaction: QA-by-Dossier-with-Constraints," 2004, 8 pages.
Ramakrishnan, G., et al., "Is Question Answering an Acquired Skill?" WWW2004, ACM May 17, 2004, pp. 111-120.
Richardson, M., et al., "Beyond Page Rank: Machine Learning for Static Ranking," International World Wide Web Conference Committee, May 23, 2006, 9 pages.
Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.
Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, Jul., Oct. 1948, pp. 1-55.
Sun Microsystems, "Attribute Names," http://java.sun.com/products/jndi/tutorial/basics/directory/attrnames.html>, Feb. 17, 2004, pp. 1-2.
Wang, Y., et al., "C4-2: Combining Link and Contents in Clustering Web Search to Improve Information Interpretation," The University of Tokyo, 2002, , pp. 1-9.
Andritsos, *Information-Theoretic Tools for Mining Database Structure from Large Data Sets*, ACM SIGMOD 2004, Jun. 13-18, 2004, 12 pages.
Chen, *A Scheme for Inference Problems Using Rough Sets and Entropy*, Department of Computer Science, Lakehead University, Thunder Bay, ON, Canada, Springer-Verlag Berlin Heidelberg, 2005, pp. 558-567.
Cover, *Entropy, Relative Entropy and Mutual Information*, Chapter 2 of Elements of Information Theory, Wiley-InterScience, New York, NY, 1991, pp. 12-23.
Koeller, *Approximate Matching of Textual Domain Attributes for Information Source Integration*, IQIS2005, Baltimore, MD, Jun. 17, 2005, pp. 77-86.

Merriam Webster Dictionary defines "normalize" as "to make conform to or reduce to a norm or standard", 1865, 2 pages.

Merriam Webster Dictionary defines "value" as "a numerical quantity that is assigned or is determined by calculation or measurement", 1300, 2 pages.

Microsoft Computer Dictionary defines "normalize" as "adjust number within specific range", May 1, 2002, 4 pages.

Microsoft Computer Dictionary Defines "quantity" as a "number", May 1, 2002, 4 pages.

Microsoft Computer Dictionary defines "value" as "a quantity", May 1, 2002, 4 pages.

Wirzenius, *C Preprocessor Trick for Implementing Similar Data Types*, Jan. 17, 2000, 9 pages.

Google, Canadian Patent Application 2610208, Office Action dated Sep. 21, 2011, 3 pgs.

Google, Japanese Patent Application 2008-504204, Office Action dated Oct. 12, 2011, 4 pgs.

\* cited by examiner

Example Format of Facts in Repository (each fact is associated with an object ID)

Example Facts in Repository (each fact is associated with an object ID)

Example Object
Reference Table**

FIG. 2(d)
Example Format of Facts in Repository (each fact is associated with an object ID)

Example Objects

| Text String | Interpretation (YYYY-MM-DD) | Confidence |
|---|---|---|
| A. 01/02/03 | YY03-01-02 (US) | 2 variables |
| | YY03-02-01 (European) | 2 variables |
| | YY03-0M-0D (ISO) | 4 variables |
| B. between 2001-2005 | 200(1-5)-MM-DD (US) | 5 variables |
| | 200(1-5)-MM-DD (European) | 5 variables |
| | 200(1-5)-MM-DD (ISO) | 5 variables |
| C. 2 Jan 203 | YYYY-01-02 (US) | 4 variables |
| | YYYY-01-02 (European) | 4 variables |
| | YYYY-01-02 (ISO) | 4 variables |
| D. Jan 2 | YYYY-01-02 (US) | 4 variables |
| | YYYY-01-02 (European) | 4 variables |
| | YYYY-01-02 (ISO) | 4 variables |
| E. 2003 | 2003-MM-DD (US) | 4 variables |
| | 2003-MM-DD (European) | 4 variables |
| | 2003-MM-DD (ISO) | 4 variables |

FIG. 5(a)

| Examples of Merger: | Noncontradictory | Common | Unambiguous |
|---|---|---|---|
| A and B: | | | |
| YY03-01-02 | | | |
| YY03-02-01 | | | |
| 200(1-5)-MM-DD | 2003-0M-0D | YY03-0M-0D | 2003-0M-0D |
| D and E: | | | |
| YYYY-01-02 | | | |
| 2003-MM-DD | 2003-01-02 | YYYY-MM-DD | 2003-01-02 |

FIG. 5(b)

Website 1 for Entity A:

Text String:          Interpretation: (YYYY-MM-DD)

01/02/03              YY03-01-02 (US)
                         YY03-02-01 (European)
                         YY03-0M-0D (ISO)

Highest confidence assigned to YY03-01-02 and YY03-02-01

Website 2 for Entity A:

Text String:          Interpretation: (YYYY-MM-DD)

January 2           YYYY-01-02 (US)
                         YYYY-01-02 (European)
                         YYYY-01-02 (ISO)

Highest confidence assigned to YYYY-01-02.

Website 3 for Entity A:

Text String:          Interpretation: (YYYY-MM-DD)

02-01-2003         2003-02-01 (US)
                         2003-01-02 (European)
                         2003-0M-0D (ISO)

Highest confidence assigned to 2003-01-02 and 2003-02-01.

Merger of highest confidence data of websites 1 and 2 =
noncontradictory data: YY03-01-02.
By common data: YYYY-01-02.        514   512

Merger of highest confidence data of websites 1, 2 and 3
    (sequential)=                       512
By noncontradictory data:   2003-01-02.
By common data:            2003-01-02.     514
By unambiguous data:      2003-01-02     516
Apply assumption of US formatting for other data obtained
    from websites 1, 2 and 3.

DATE AMBIGUITY RESOLUTION

TECHNICAL FIELD

The disclosed embodiments relate generally to extracting data from a collection of documents. More particularly, the disclosed embodiments relate to resolving ambiguities in dates that have been extracted from documents such as web pages.

BACKGROUND

Dates extracted from conflicting or unreliable sources have a variety of formats and usually contain a number of incorrect values or typographical errors. It is useful to have a way to increase the confidence of the collected information, to clarify ambiguous information, and to increase the accuracy in the date values.

What is needed is a method for resolving ambiguities and errors in date values associated with a topic so that date values related to that topic can be reliably determined.

SUMMARY

In accordance with one aspect of the invention, a method may perform obtaining a first text string associated with an attribute; determining if the first text string conforms to one or more date formats; assigning a confidence value for each of the date formats for the first text string based on an amount of specificity with which the first text string conforms to each date format; obtaining a second text string associated with the attribute; determining if the second text string conforms to one or more of the date formats; assigning a confidence value for each of the date formats for the second text string based on an amount of specificity with which the second text string conforms to each date format; and merging a date format with a highest confidence value for the first text string and a date format with a highest confidence value for the second text string to obtain a date value for the attribute.

In one embodiment of the invention, a system may include a date formatter, having as input at least a first text string and a second text string, the date formatter to determine if the first text string conforms to one or more date formats and to determine if the second text string conforms to one or more date formats; a confidence assignor to assign a confidence value for each of the date formats based on an amount of specificity with which each text string conforms to each date format; and a merger to merge a date format with a highest confidence value for the first text string and a date format with a highest confidence value for the second text string to obtain a date value for the attribute.

BRIEF DESCRIPTION OF THE DRAWINGS

FIG. 2(*e*) is a block diagram illustrating an alternate data structure for facts and objects in accordance with preferred embodiments of the invention.

FIG. 3(*b*) is a data flow diagram illustrating a date resolution janitor, according to one embodiment of the present invention.

FIGS. 5(*a*)-5(*b*) are examples illustrating a method for resolving ambiguities in date values, according to one embodiment of the present invention.

FIGS. 5(*c*)-5(*e*) are examples illustrating a method for resolving ambiguities in date values, according to one embodiment of the present invention.

DESCRIPTION OF EMBODIMENTS

Embodiments of the present invention are now described with reference to the figures where like reference numbers indicate identical or functionally similar elements.

Figure 1:
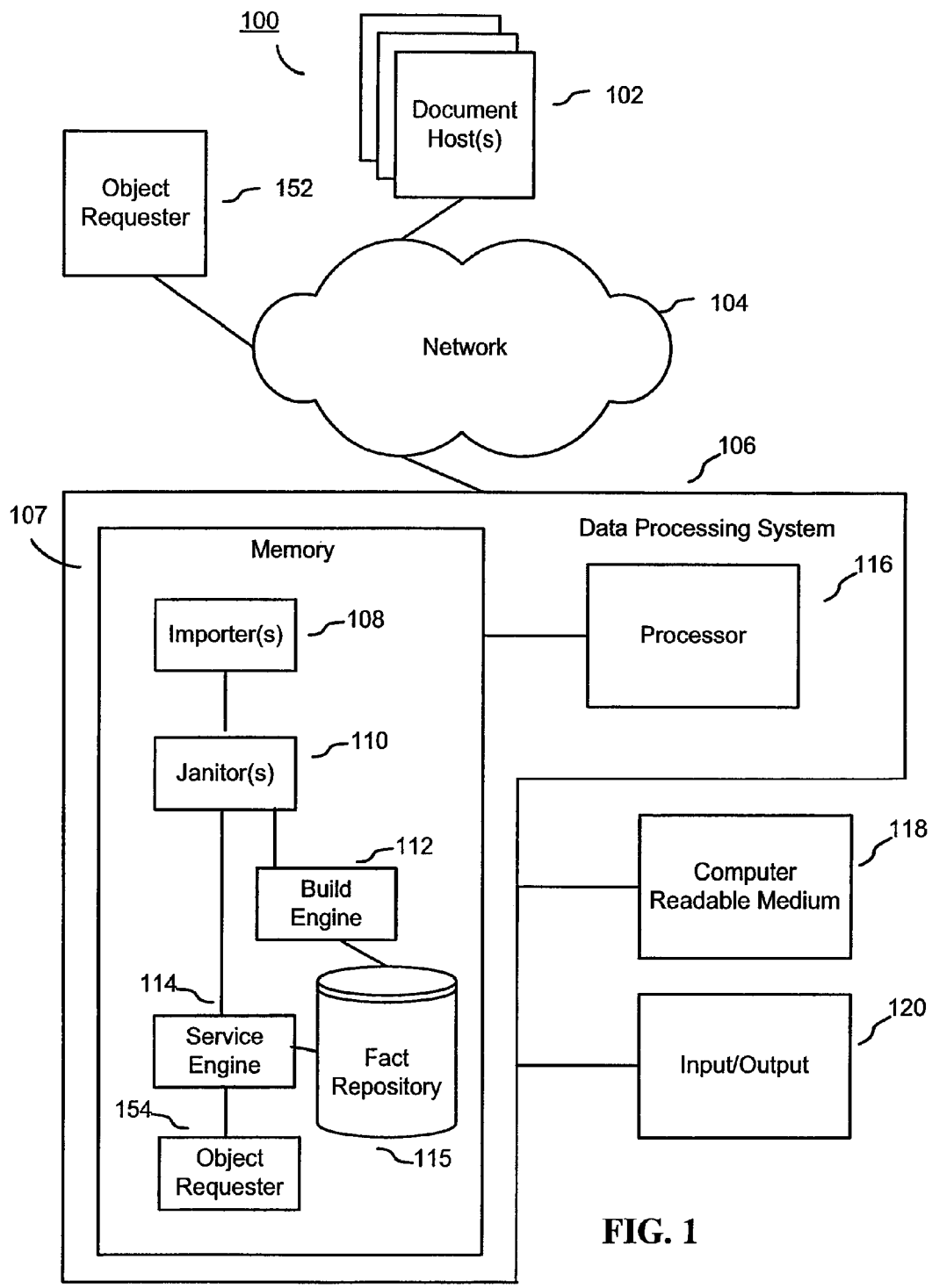
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any text string of document hosts 102 communicate with a data processing system 106, along with any text string of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), e.g., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as Birthdate by one janitor and then another janitor might notice that 12/2/1981 and December 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any text string of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any text string of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

FIG. 2(*a*) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "February 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The text string of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, text strings, perhaps even tables of figures. This content can be formatted, for example, in a markup language. For example, a fact having an attribute "original html" might have a value of the original html text taken from the source web page.

Figure 2A:
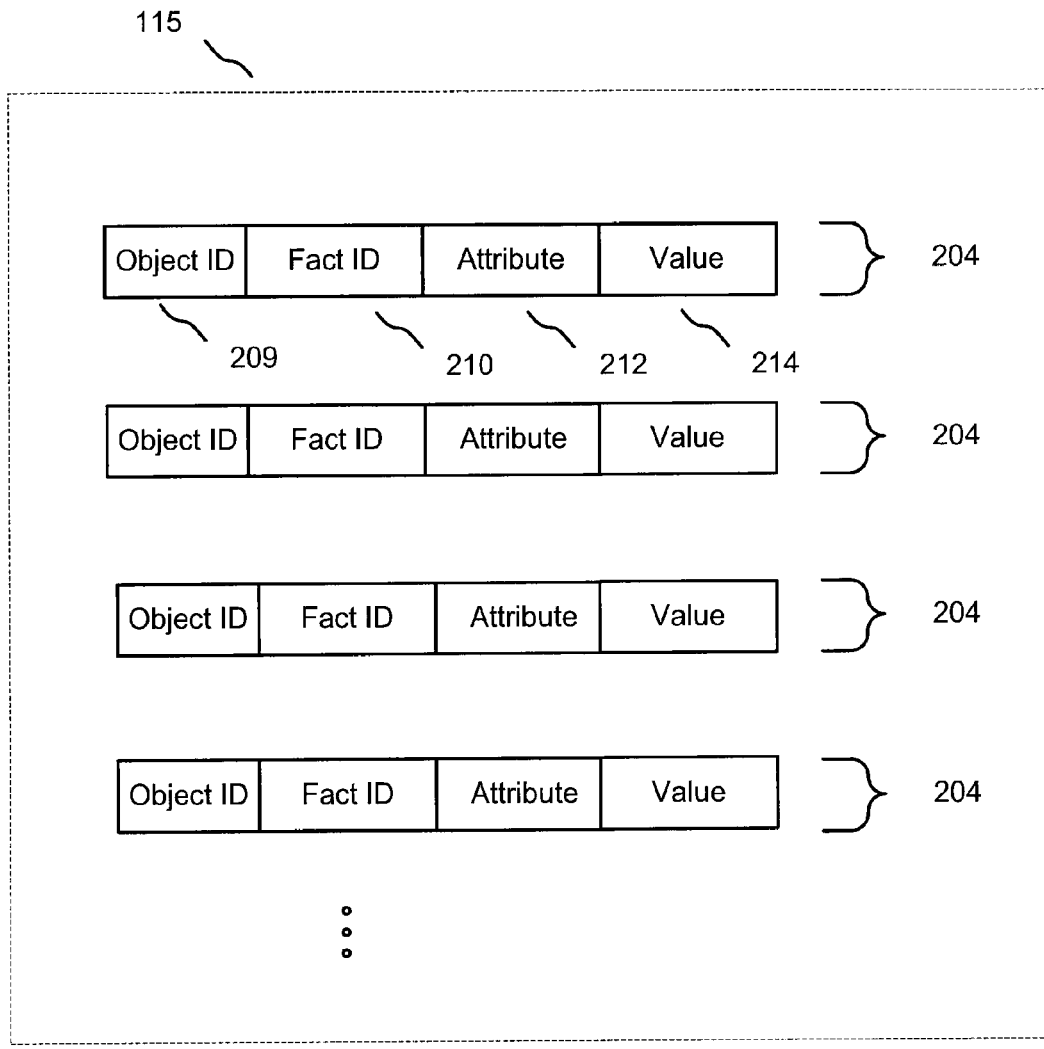
FIGS. 2(*a*)-2(*d*) are block diagrams illustrating a data structure for facts within a repository of FIG. 1 in accordance with preferred embodiments of the invention.
Figure 2B:
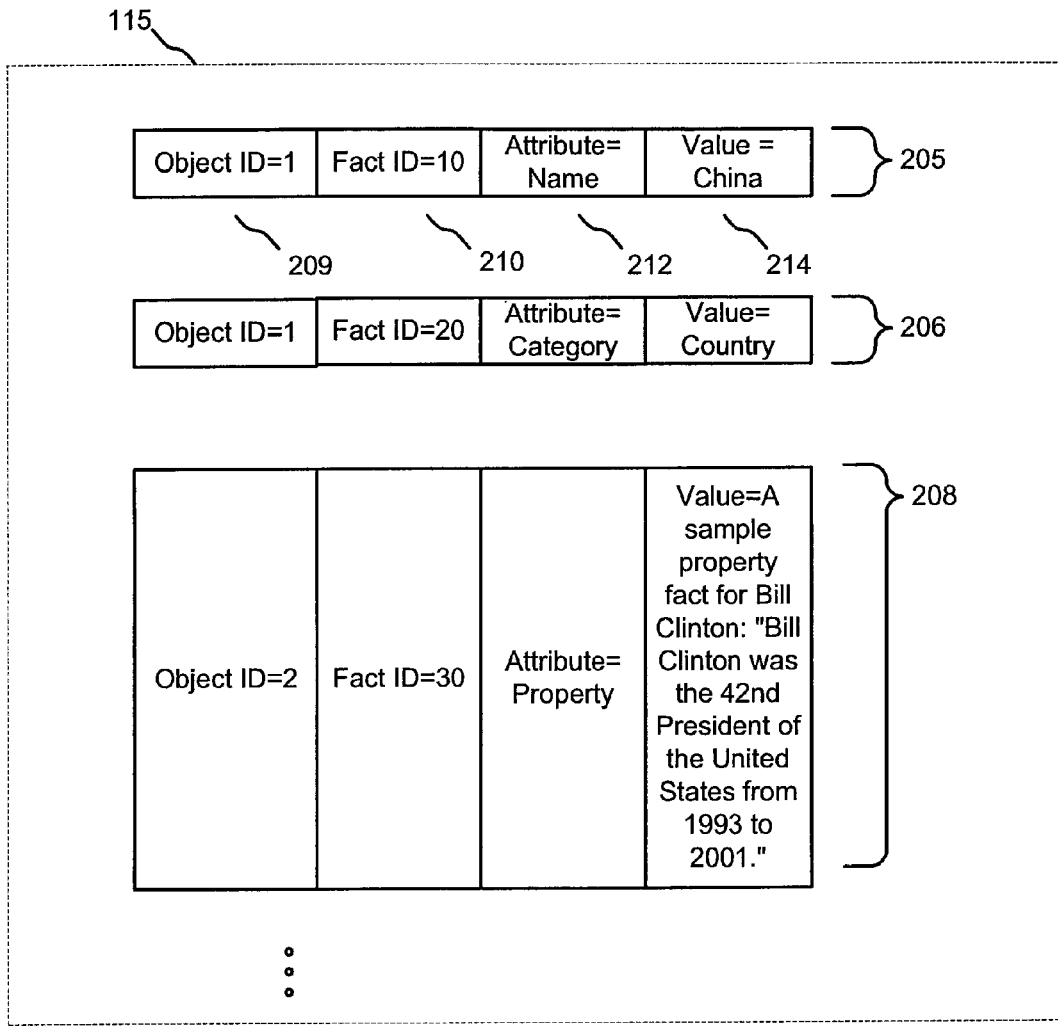

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
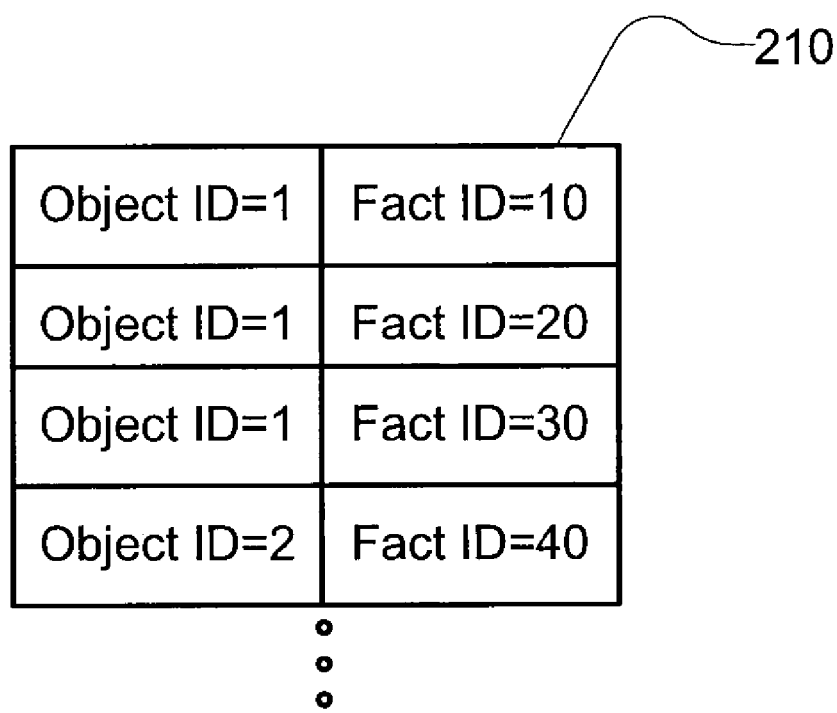
Figure 2D:
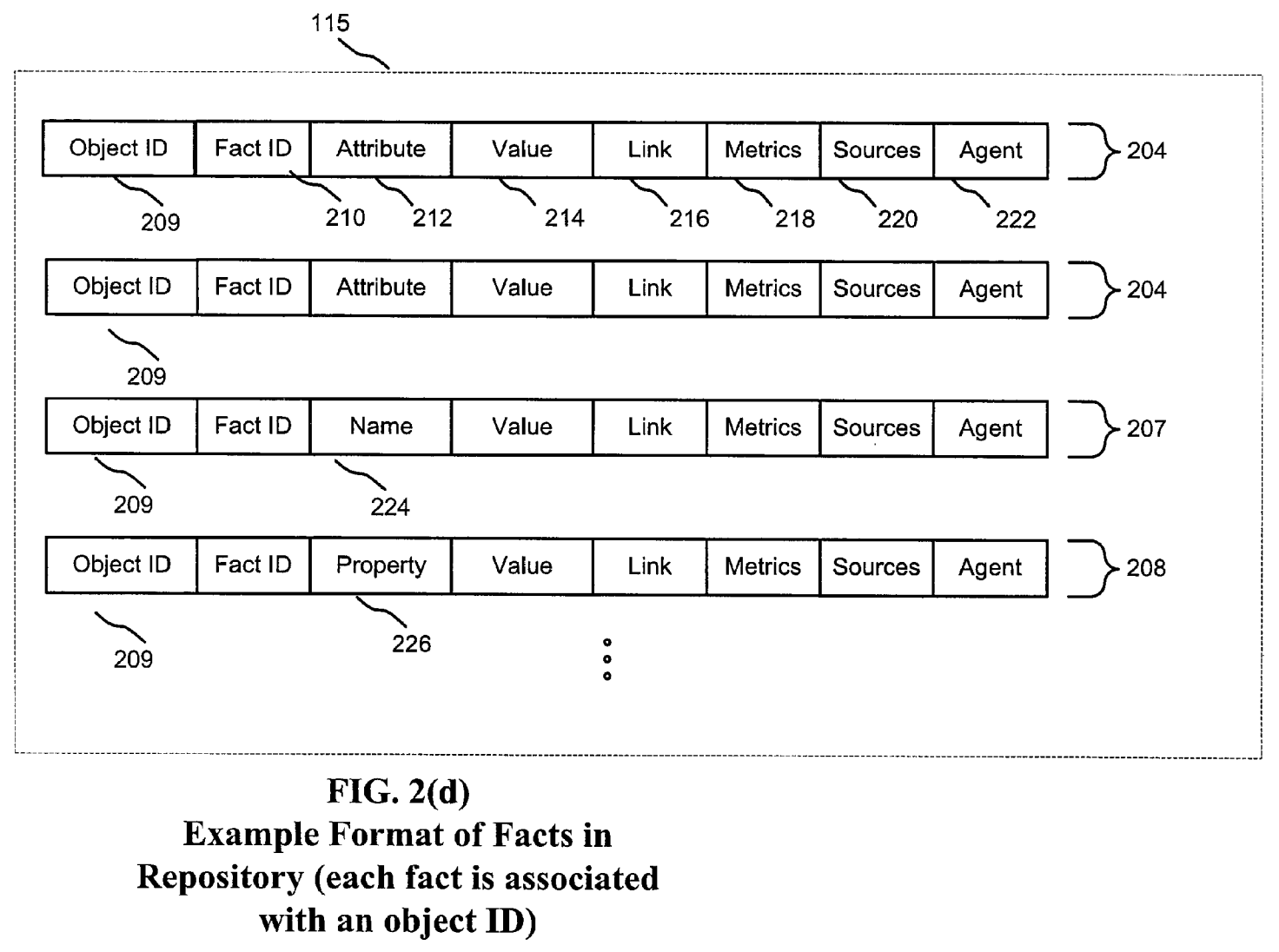
Figure 2E:
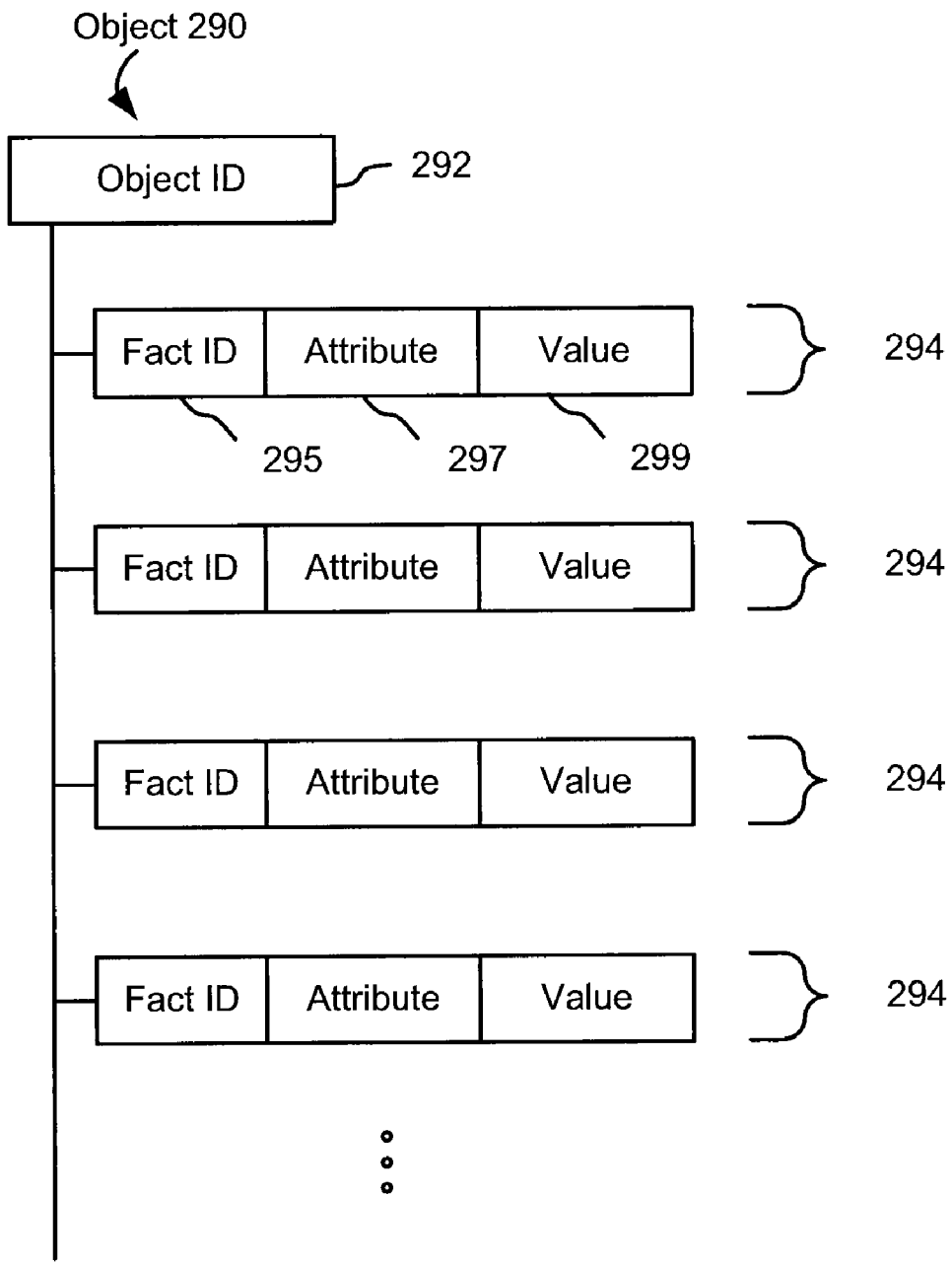

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s)

and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

FIG. 2(*e*) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3A:
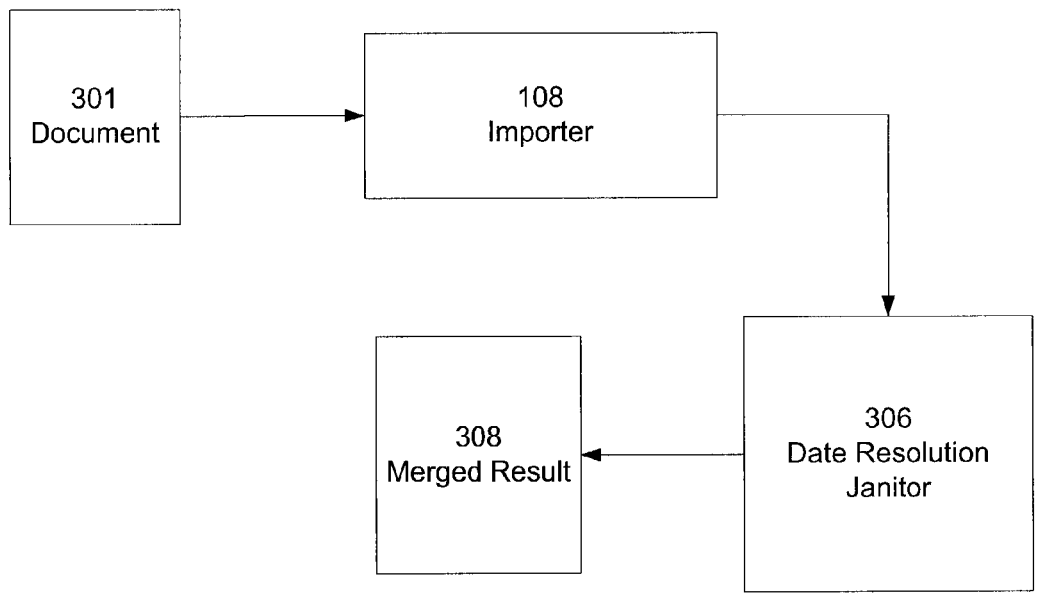
FIG. 3(*a*) is a data flow diagram illustrating a date resolution janitor, according to one embodiment of the present invention.
Figure 3B:
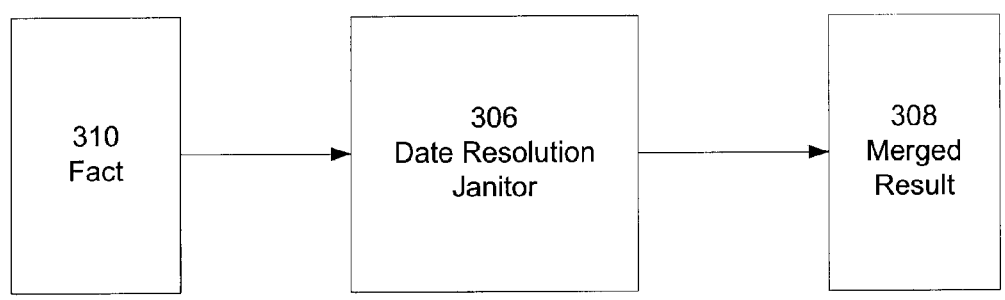

FIG. 3(*a*) is a data flow diagram illustrating the role of a date resolution janitor 306, according to one embodiment of the present invention. As described above, a document 301 is processed by an importer 108 to locate a text string that may be a date. The document 301 may contain text with at least one numeral, such as "Britney Spears was born on December 2, 1981" or may only contain numerals and delimiters, such as "12/2/81." According to one embodiment, date resolution janitor 306 determines whether at least one text string listed within document 301 conforms to one or more date formats, as described below with reference to FIGS. 4 and 5(*a*). Date resolution janitor 306 assigns confidence values based on the amount of specificity with which each text string conforms to the date format, and merges the date formats with the highest confidence values, producing merged result 308. The process of assigning confidence values and merging is described below with reference to FIGS. 4-5(*e*).

FIG. 3(*b*) is a data flow diagram illustrating the role of a date resolution janitor 306, according to one embodiment of the present invention. Previously, fact 310 has been extracted from a document, such as a website, and may be stored within a computer memory. According to one embodiment, a determination is made whether at least one text string listed within fact 310 conforms to one or more date formats. Date resolution janitor 306 assigns confidence values based on the amount of specificity with which each text string conforms to the date format, and merges the date formats date formats with the highest confidence values, merged result 308.

For the purposes of illustration, a single document 301 is shown in FIG. 3(*a*) and a single fact 310 is shown in FIG. 3(*b*). In another embodiment, a plurality of documents and/or a plurality of facts may be used by the date resolution janitor 306. Resolving date ambiguity using a plurality of documents and/or facts may be performed iteratively, in parallel, or both.

Figure 4:
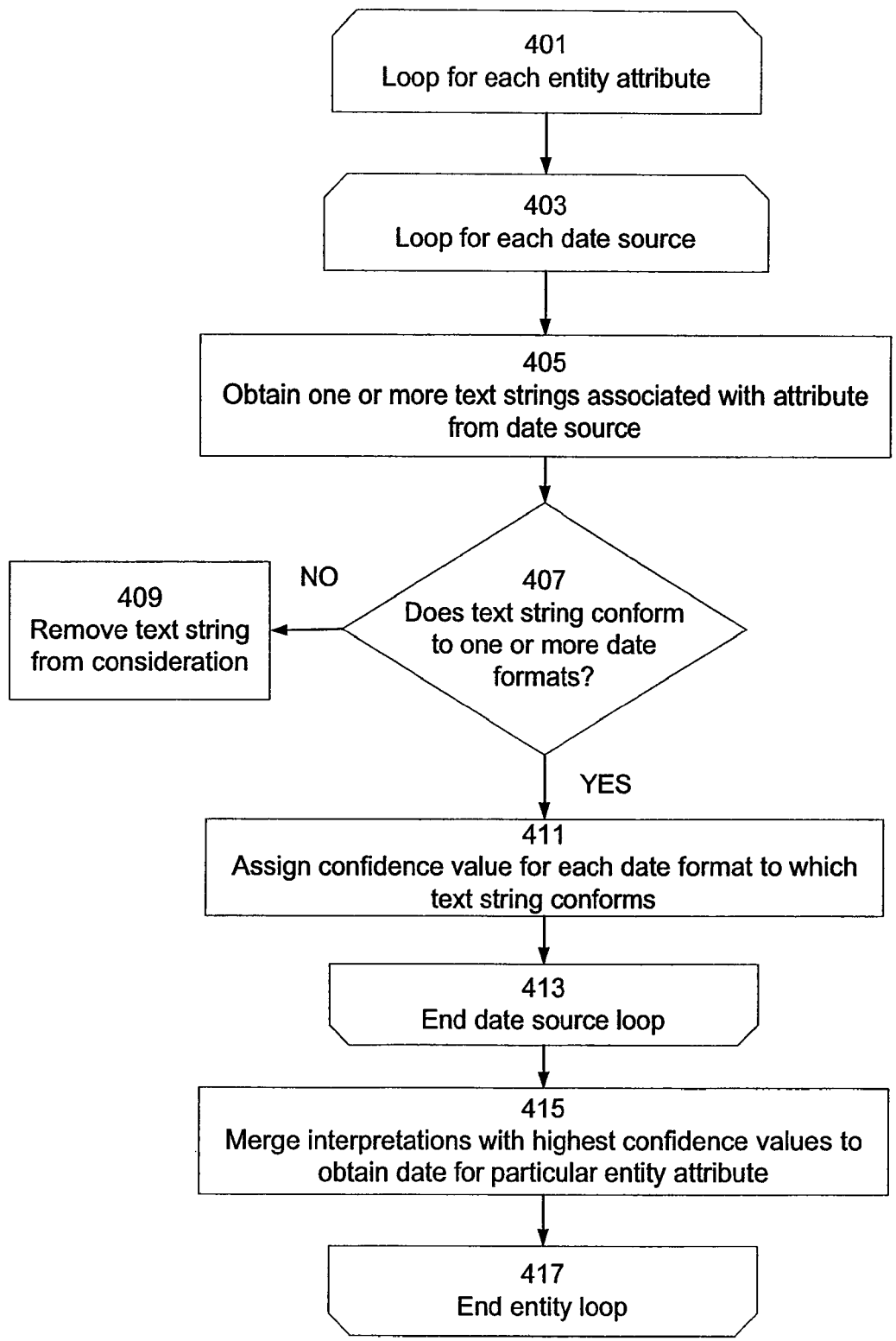
FIG. 4 is a flow chart illustrating a method for resolving ambiguities in date values, according to one embodiment of the present invention.

FIG. 4 is a flow chart illustrating a method for resolving date ambiguity, according to one embodiment of the present invention. While the method is described with reference to FIG. 4 as being performed by a date resolution janitor 306 on information from one or more websites, the method is also useful in other contexts in which it is desired to resolve ambiguity in dates, for example, from information stored in a fact repository or other data structure or memory. FIG. 4 shows that the method contains an outer loop for each entity attribute 401, 417 and an inner loop for each date source 403, 413. Thus, a particular entity may have multiple text strings associated with it and the method will loop through all strings associated with that entity. Similarly, a particular text string may have multiple potential dates within it and the method will loop through all potential dates. Other embodiments merely receive a text string for evaluation, determine that the text string conforms to a particular date format, and use the determination to obtain the date for the entity attribute; these embodiments do not include looping through multiple entities and/or multiple dates within a string.

As shown in FIG. 4, one or more text strings associated with an attribute and containing at least one numeral is obtained 405 for an entity attribute from a date source. For example, the text string "01/02/81" may be associated with a "Date of Birth" attribute for the entity "Britney Spears." An example of a date source may be www.nationalenquirer.com.

The date resolution janitor 306 determines whether the text string conforms to one or more date formats 407, according to one embodiment. Determining whether a text string conforms to one or more date formats 407 may be accomplished in a variety of ways, including analyzing the syntax of the sentence where the numeral appears, examining the separators between numerals (e.g., slashes, commas, periods, spaces), looking for keywords (in various languages), or any of a variety of methods understood by one of ordinary skill in the art. In one embodiment, all text strings containing numerals within a document are assumed to be date values.

The examples below illustrate one method of determining whether text strings containing numerals conform to one or more date formats 407, according to one embodiment. The regular expressions of how "year", "month", "day" and so forth may be defined within the various date formats will be described below, beginning at paragraph 52.

In one embodiment, the following regular expression defines a date in ISO format (YYYY-MM-DD for year, month, day):
// Begin specific formats
// year-month-day ("ISO")
// year
static const string iso_date(
"\\b(?:"+day_of_week_word+separator+")?"+
"(?:"+year_match+")"+
"(?:"+separator+month_match+")?"+
"(?:"+separator+day_text string+")?\\b");
static const RE iso_timespan_match(
"(.*?)(?<!\\d"+separator_without_spaces+")"+
iso_date+"(?:"+range_separator+iso_date+")?"
"(?!"+separator_without_spaces+"\\d)(*)");

In one embodiment, the following regular expression defines a date in United States date format (month, day, year):
// month-day-year ("US")
// month-day
static const string us_date(
"\\b(?:"+day_of_week_word+separator+")?"+
"(?:"+month_match+")"+
"(?:"+separator+day_text string+")"+
"(?:"+separator+year_match+")?\\b");
static const RE us_timespan_match(
"(.*?)(?<!\\d"+separator_without_spaces+")"+
us_date+"(?:"+range_separator+us_date+")?"
"(?!"+separator_without_spaces+"\\d)(*)");

In one embodiment, the following regular expression defines a date in European date format (day, month, year):

```
// day-month-year ("European")
// month-year (Special case of European without a day.)
// day-month (Special case of European without a year.)
static const string european_date(
  "\\b(?:"+day_of_week_word+separator+")?"+
  "(?:"+day_text string+separator+")?"+
  "(?:"+month_match+")"+
  "(?:"+separator+year_match+")?\\b");
static const RE european_timespan_match(
  "(.*?)(?<!\\d"+separator_without_spaces+")"+
  european_date+"(?:"+range_separator+european_date+")?"
  "(?!"+separator_without_spaces+"\\d)(*)");
```

In one embodiment, the following regular expressions are an example of how "year", "month", "day" and so forth may be defined within the various date formats described above.

In one embodiment, the following regular expression defines a year:

```
// A year can be any text string with up to 4 digits not surrounded by
// digits, with an optional bc/ad before or after. Note that this
// adds three parenthesized expressions: the bc/ad prefix, the numeric
// year, and the bc/ad suffix.
const string bc_ad("((?i)a\\.?d\\.?|b\\.?c\\.?e?\\.?)");
const string TimespanJanitor::year_match(
  "(?:(?:"+bc_ad+"\\s*)?(?<!\\d)(\\d{1,4})(?!\\d)"+
  "(?:\\s*"+bc_ad++")?)");
```

In one embodiment, the following regular expression defines a month:

```
const string TimespanJanitor::month_word(
  "(?:(?i)"
  "(?:(?<[a-z])"
  "(?:January|February|March|April|May|June|"
  "July|August|September|October|November|December)
  (?![a-z]))|"
  "(?:(?<![a-z])(?:
Jan|Feb|Mar|Apr|Jun|Jul|Aug|Sep|Sept|Oct|Nov|Dec)"
  "(?![a-z])"
  "1\\.?))");
// Month can be any of 1-9 or 10-12, surrounded by non-text strings.
const string TimespanJanitor::month_text string(
  "(?:(?<!\\d)(?:0?[1-9]|1[0-2])(?!\\d))");
// Note that this adds one parenthesized expression—the month in
// whatever form it's given.
const string TimespanJanitor::month_match(
  "("+month_word+"|"+month_text string+")");
```

In one embodiment, the following regular expression defines a numeric day:

```
// Day can be any of 1-9, 10-19 or 20-29, or 30 or 31, surrounded by
// non-digits. Note that this adds one parenthesized expression--
// the numeric day.
const string TimespanJaniton:day_text string("(?:(?<\\d)"
  "(0?[1-9]|(?:1|2)[0-9]|3[0-1]))"
  "(?!\\d)"
  "(?:\\s*(?:st|nd|rd|th)\\b)?");
```

In one embodiment, the following regular expression defines a day of the week word:

```
// Note that this adds one parenthesized expression—the day of the
// week.
const string TimespanJanitor::day_of_week_word(
  "((?i)"
  "Sunday|Monday|Tuesday|Wednesday|Thursday|Friday|
     Saturday|"
  "(?:(?:Sun|Mon|Tue|Tues|Wed|Thu|Thurs|Fri|
     Sat)\\.?))");
```

In one embodiment, the following regular expression defines separators month, day and year:

```
const string TimespanJaniton:separator_without_spaces
  ("(?:\\.|-|,|/)+");
const string TimespanJaniton:separator("(?:\\.|-|,|/|\\s)+");
```

In one embodiment, the following regular expression defines a range separator:

```
const string TimespanJaniton:range_separator(
  "\\s*(?:(?i)to|thru|through|until|-)\\s*");
```

If a text string does not conform to any date format, it may be removed from consideration 409. For example, the text string "123.456.7891111" would be removed from consideration because it does not match any of the regular expressions, according to one embodiment. However, the text string "123456.01.03.05" might not be removed, as a portion of the text string "01.03.05" may conform to one or more of the date formats.

FIG. 5(a) illustrates an example of assigning confidence values 510 (411, FIG. 4) to date formats. If a string conforms to one or more date formats, a confidence value is assigned to each conforming format 411. FIG. 5(a) shows a variety of text strings (A-E) from various sources selected as potential values for the birth date attribute for a given entity.

According to one embodiment, interpretations may be used to facilitate assigning confidence values. Interpretations may take various forms. As an example, an interpretation used may be YYYY-MM-DD, where the YYYY represents the four digit representation of a year, MM represents the two digit representation of month, and DD represents the two digit representation of day. This interpretation corresponds to the ISO dating conventions. For convenience, the format of YYYY-MM-DD is used throughout the Figures and discussion when discussing date interpretation, although other formats may be used. Other interpretations may have further specificity, such as time or day of week. In addition, any other desired interpretation may be used.

In FIG. 5(a), a document (website) contains a text string 506 (A) of "01/02/03." FIG. 5(a) shows how the text string 506 would be interpreted in light of the various dating conventions or formats that could be used. The date format interpretation in column 508 (YYYY-MM-DD) for example (A) would be YY03-01-02 (for the United States dating convention), YY03-02-01 (for the European dating convention, where the day is "01" and the month is "02") or YY03-0M-0D (for the ISO dating convention). The ISO interpretation shown is YY03-0M-0D because, in one embodiment, that is the best potential match for the ISO regular expression under the assumption that the string contains only one date. In the embodiment depicted in this example, the year is "03" based on the assumption that the information occurring before the date is more likely to be incorrect than the information occurring after the date. In another embodiment, there would be multiple ISO interpretations (YY03-0M-0D, YY01-0M-0D, YY02-0M-0D). In another embodiment, the interpretation for ISO dating convention would be YY03-MM-DD, where the MM and DD segments are matched on an all or nothing basis.

Both the US and European date format interpretations have two variables, "YY", and would therefore be assigned the highest confidence among the possible date formats. However, the ISO convention, YY03-0M-0D, has four undefined variables, "YY03-0M-0D," and therefore will be assigned a lower confidence, according to one embodiment. Those of ordinary skill in the art will recognize, as illustrated in the foregoing example, that more than one date format may have the same "highest confidence value."

According to one embodiment, date formats containing higher specificity may be assigned higher confidence values that the string represents a date. As an example, "12:30:02 pm on July 9, 2023" would be tagged "very certain," whereas "1996" would be tagged "maybe." In addition, where an estimation has been made (e.g., that "1/2/03" has a year of "2003"), the confidence value may be reduced. One skilled in the art will recognize that the confidence values assigned may be, for example, text strings, words, graphics and other types of tags.

In contrast with string A, the date formats of strings B, C, D, and E respectively in FIG. 5 each receive the same level of confidence in interpretation regardless of the dating convention used, as can be seen by the number of variables under Confidence 510.

In another embodiment, Example E from FIG. 5(a) (which is a text string 506 of "2003") would allow for the date format to be interpreted as shown "2003-MM-DD" in FIG. 5(a) or as a range from "2003-01-01 to 2003-12-31" (not shown). Similarly, the range displayed in Example B "between 2001-2005" may be interpreted as shown in FIG. 5(a) or may be interpreted as "2001-01-01 to 2005-12-31" (not shown).

According to another embodiment, date format interpretations need not be used in assigning confidence values. Instead, confidence values can be assigned directly to one or more date formats without using an interpretation. For example, a higher confidence value can be assigned to a date format with more specificity than another format with less specificity (e.g. "January 12, 2004 at 12:01 p.m." would have a higher confidence value than "1/12/04").

Referring again to FIG. 4, the process 405-411 may be looped for each date source (403-413). Thus, as shown in FIG. 4, a confidence value may be assigned to one or more text strings containing a numeral obtained from one or more sources (i.e. multiple web pages, multiple entries on one web page, or from single or multiple facts or objects in a memory).

In one embodiment, once confidence values have been assigned 411 for each format to which the text string conforms, the date format interpretations with the highest confidence values are merged 415. The merger of the date formats with the highest confidence values 415 may take place each time confidence values are assigned to date formats from a date source, after confidence values are assigned to date formats from many date sources, or at any other desired time. For example, the date source loop could also end after the date formats are merged (not shown), such that the loop would proceed from 403 to 415, with the date source loop ending after the merger 415 is completed.

The merger of date formats with the highest confidence values 415 may be carried out in many ways. FIG. 5(b) shows three such ways. For example, as shown in FIG. 5(b), highest confidence date formats may be merged, such that their noncontradictory components are retained in the merged result.

In FIG. 5(b), the noncontradictory merger (column 512) of the highest confidence date formats of Examples A and B from FIG. 5(a) results in a noncontradictory date value "2003-0M-0D." The "YY03" year obtained from Example A does not contradict the "2003" part of the year range "2000 (1-5)" in Example B. Since both the US and European interpretation have a highest confidence rating in Example A, the described method looks at both. The "0M-0D" portion is noncontradictory for highest confidence date formats of Examples A and B.

In FIG. 5(b), the noncontradictory merger (column 512) of the highest confidence date formats of Examples D and E from FIG. 5(a) results in a noncontradictory date value "2003-01-02." The "2003" obtained from Example E does not contradict the "YYYY" variables in Example D. Similarly, the "01-02" obtained from Example D does not contradict the "MM-DD" variables from Example E.

Common merger, another way in which to merge highest confidence date formats, is illustrated in column 514 of FIG. 5(b). When the highest confidence format interpretations from Examples A and B from FIG. 5(a) are merged such that the common 514 elements are retained, the result is YY03-0M-0D. When Examples D and E from FIG. 5(a) are merged such that the common 514 elements are retained, the result is YYYY-MM-DD because there are no elements in common between Examples D and E.

Unambiguous merger, another way to merge highest confidence date formats, is shown in column 516 of FIG. 5(b). When the highest confidence format interpretations from Examples A and B from FIG. 5(a) are merged such that the unambiguous elements are retained, the result is 2003-0M-0D. This outcome is reached because the merger of the year "200(1-5)" from Example B and "YY03" from Example A can only be interpreted in one way (as "2003") while "01/02" is ambiguous as either being January 2 or February 1. When Examples D and E from FIG. 5(a) are merged such that the unambiguous elements are retained, the result is 2003-01-02 because the year "2003" from Example E can only be interpreted in one way and "Jan 2" can only be interpreted in one way.

Common merging 514 is preferred when the accuracy desired is high, according to one embodiment. Noncontradictory merging 512 is preferred when obtaining the most complete estimate is the desired outcome, according to one embodiment. Unambiguous merger 516 is useful where limited data is available and an estimate is needed, according to one embodiment. However, the accuracy of an unambiguous 516 and noncontradictory merger 512 may be diminished where the text string of data points is small. While FIG. 5(b) illustrates three methods of merging the highest confidence values, one of ordinary skill in the art will recognize that numerous methods of merging may be used.

The merger of the highest confidence date formats of text strings from a plurality of sources, for an attribute of a single entity, is illustrated in FIGS. 5(c)-5(e). FIG. 5(c) shows strings from web sites 1, 2, and 3 and the highest confidence values assigned to various date interpretations of the strings. The merger of date formats with the highest confidence values from websites 1 and 2 is shown in FIG. 5(d). Because website 2 lists the text string as "January 2", and website 1 lists the text string as "01/02/03", the merger of the noncontradictory 512 components of the highest confidence interpretation results in "YY03-01-02" (because "January 2" of website 2 does not contradict "01" of website 1). Similarly, because website 2 has no listing for the year, the "03" of website 1 does not contradict website 2.

Common merger 514 results in a date format of YYYY-01-02. The month,"01", is common to both sites. However, because the sites do not have the year in common, the "YYYY" variables cannot be resolved in the merged result using common merger 512.

As illustrated in FIG. 5(*e*), when the merged results of websites 1 and 2 are merged with website 3 under noncontradictory merger 512 or common merger 514, the result is "2003-01-02." The merged results of the highest confidence date formats of websites 1 and 2 are "YY03-01-02" (noncontradictory) and "YYYY-01-02" (common) (because "January 2" is common and noncontradictory to both sites, and "03" is noncontradictory, but not common to website 2). Thus, the only missing variable is the year. For both of the highest confidence date formats for website 3, the year is 2003. Therefore, both the common and noncontradictory merged result of websites 1, 2 and 3 is "2003-01-02." Consequently, the date 2003-01-02 is used as the birth date for entity A.

In addition, the result is the same if the websites 1, 2 and 3 were merged as an "unambiguous merger" 516. Because the month and day of website 2, "January 2", is unambiguous, and the year of website 3 "2003" is unambiguous, the outcome would be "2003-01-02."

Merging may take place at any desired time. In the examples discussed above with respect to FIGS. 5(*c*)-5(*e*), the merger of website takes place after websites 1 and 2 have a merged result. In another embodiment, the merger may take place after highest confidence values have been assigned to a large number of date formats.

The merger comparison can be performed using a variety of thresholds. Different thresholds may be useful for different purposes. For example, after a threshold number of date sources with identical date formats for the same attribute are obtained, the determination may be made that the merged result is sufficiently accurate. As another example, if a threshold percentage of dates for an attribute have the same format, the method may not look at more text strings. The date format of the merged result may then be applied to all text strings that correspond to a date format from at least one domain from which the merged result was obtained. For example, one embodiment may assume that dates on all pages of a website have the same format until proven otherwise.

In addition, the method may allow application of particular rules in resolving ambiguity in date values. Such rules may be applied to ensure that an obtained date value is consistent with rules related to the attribute and/or to determine whether a text string is consistent with rules relating to an attribute.

In one embodiment, the known relationships of data for attributes may be examined for consistency among merged results. For example, a rule may be that the value of the date of birth attribute must be earlier than the value of the date of death attribute for a given entity. As another example, a rule may be that the value of a date of birth attribute must have a time, day, month, date and year.

Also, another rule may be that if the text strings fall under only one valid date format interpretation, the system may use that interpretation for all text strings on the domain (e.g., "01/17/2003" has only one valid interpretation of "2003-01-17" because "17" cannot represent a month). The system could also interpret a string that would be spell corrected to a date (e.g., "Februar 17, 1972" would be interpreted as "1972-02-17"). Another rule might discard dates that are outside of recognized boundaries (e.g., "6 May 196" would be discarded as outside of a rule that "YYYY for a living person is 1880<YYYY<2007") or might only discard the components of the text string that are inconsistent with the rule (e.g., "6 May 196" would be interpreted as "YYYY-05-06"). Another rule might estimate dates as nearest to the closest century (e.g., Jan. 2, 2003 would assume the year was 2003, as opposed to 1903 or earlier). In addition, the system may also resolve date ambiguity by examining the global domain name extension (e.g., .uk, .jp, .us) of the page or domain from which the text string was obtained. One of ordinary skill in the art will recognize that additional rules to resolve ambiguity in date values could be applied.

Returning to FIG. 4, the method described with reference to numerals 403-415 may be looped for separate entity attributes (401-417). For example, the method may be performed for the birth date attribute of the "Britney Spears" entity and then the wedding date attribute of the "Britney Spears" entity. The method may also be performed again to determine the birth date attribute of the "Gwyneth Paltrow" entity.

The method depicted in FIG. 4 illustrates the resolution of ambiguous date values for one attribute, such as date of birth, for one entity. However, one of ordinary skill in the art would recognize that each entity may have multiple attributes for which associated date values could be disambiguated, such at date of birth, date of death, rookie year, etc. In addition, FIG. 4 illustrates that each entity has only one date. One of ordinary skill in the art would recognize that each entity may have more than one text string containing a numeral associated with some attributes. For example, an entity may have lived in a particular location for multiple years. Furthermore, each date source may contain more than one text string containing a numeral associated with each attribute. For example, Britney Spears' birthday may appear several times on one webpage in the same or different formats.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, text strings, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for resolving ambiguities in date values associated with an attribute of an entity, the method comprising:
   at a computer system including one or more processors and memory storing one or more programs, the one or more processors executing the one or more programs to perform the operations of:
   obtaining a first text string associated with an attribute of an entity, wherein the first text string is extracted from a first web document;
   determining that the first text string conforms to one or more date formats;
   assigning a first confidence value for each of the date formats for the first text string based on a first number of unknown variables that remain when interpreting the first text string using each of the date formats;
   obtaining a second text string associated with the attribute of the entity, wherein the second text string is extracted from a second web document;
   determining that the second text string conforms to one or more of the date formats;
   assigning a second confidence value for each of the date formats for the second text string based on a second number of unknown variables that remain when interpreting the second text string using each of the date formats;
   determining a first date string expressed in a date format with a highest first confidence value for the first text string;
   determining a second date string expressed in a date format with a highest second confidence value for the second text string; and
   merging a first subset of the first date string and a second subset of the second date string to obtain a date value for the attribute.

2. The method of claim 1, further comprising:
   determining whether the obtained date value is consistent with rules related to the attribute.

3. The method of claim 1, further comprising:
   determining whether the first text string is consistent with rules related to the attribute.

4. The method of claim 1, further comprising:
   applying a date format for the obtained date value to all text strings that conform to one or more date formats from at least one domain from which the obtained date value was obtained.

5. The method of claim 1, wherein the first text string is interpreted as a range of time.

6. The method of claim 1, wherein the merging of the date formats retains components of the date format for the first text string and components of the date format for the second text string that do not conflict.

7. The method of claim 1, wherein the merging of the date formats retains component; of the date format for the first text string and components of the date format for the second text string that are common to both formats.

8. The method of claim 1, wherein the merging of the date formats retains components of the date format for the first text string and components of the date format for the second text string that are not ambiguous.

9. The method of claim 1, wherein a respective text string is obtained from a respective date source, and wherein the method further comprises:
   repeating the operations of claim 1 until a threshold number of date sources with identical date formats for the attribute are obtained.

10. The method of claim 1, wherein the attribute is a date of birth.

11. The method of claim 1, wherein the steps are repeated for multiple attributes of one entity.

12. The method of claim 1, wherein one of the date formats is a United States date format.

13. The method of claim 1, wherein one of the date formats is a European date format.

14. The method of claim 1, wherein the confidence value for a respective date format is further based on an amount of specificity of the respective date format, the amount of specificity of the respective date format being selected from the group consisting of:

a number of unknown variables in the respective date format;

a precision of the respective date format.

15. The method of claim 1, further comprising:
determining a threshold number of date formats to be merged to obtain a date value.

16. A computer system for resolving ambiguities in date values associated with an attribute of an entity, the computer system comprising:
one or more processors;
memory; and
one or more programs stored in the memory, the one or more programs comprising instructions to:
obtain a first text string associated with an attribute of an entity, wherein the first text string is extracted from a first web document;
determine if that the first text string conforms to one or more date formats;
assign a first confidence value for each of the date formats for the first text string based on a first number of unknown variables that remain when interpreting the first text string using each of the date formats;
obtain a second text string associated with the attribute of the entity, wherein the second text string is extracted from a second web document;
determine if that the second text string conforms to one or more date formats;
assign a second confidence value for each of the date formats for the second text string based on a second number of unknown variables that remain when interpreting the second text string using each of the date formats;
determine a first date string expressed in a date format with a highest first confidence value for the first text string;
determine a second date string expressed in a date format with a highest second confidence value for the second text string; and
merge a first subset of the first date string and a second subset of the second date string to obtain a date value for the attribute.

17. The system of claim 16, further comprising instructions to:
determine whether the obtained date value is consistent with rules related to the attribute.

18. The system of claim 16, further comprising instructions to:
determine whether the first text string is consistent with rules related to the attribute.

19. The computer system of claim 16, wherein the confidence value for a respective date format is further based on an amount of specificity of the respective date format, the amount of specificity of the respective date format being selected from the group consisting of:
a number of unknown variables of in the respective date format;
a precision of the respective date format.

20. The system of claim 16, further comprising instructions to:
apply a date format for the obtained date value to all text strings that conform to one or more date formats from at least one domain from which the obtained date value was obtained.

21. The system of claim 16, wherein the first text string is interpreted as a range of time.

22. The system of claim 16, wherein the merging of the date formats retains components of the date format for the first text string and components of the date format for the second text string that do not conflict.

23. The system of claim 16, wherein the merging of the date formats retains components of the date format for the first text string and components of the date format for the second text string that are common to both formats.

24. The system of claim 16, wherein the merging of the date formats retains components of the date format for the first text string and components of the date format for the second text string that are not ambiguous.

25. The system of claim 16, wherein a respective text string is obtained from a respective date source, and wherein the system further comprises instructions to:
repeat the instructions of claim 14 until a threshold number of date sources with identical date formats for the attribute are obtained.

26. The system of claim 16, wherein the attribute is a date of birth.

27. The system of claim 16, wherein the instructions are repeated for multiple attributes of one entity.

28. The system of claim 16, wherein one of the date formats is a United States date format.

29. The system of claim 16, wherein one of the date formats is a European date format.

30. The system of claim 16, further comprising instructions to:
determine a threshold number of date formats to be merged to obtain a date value.

31. A computer program product comprising a computer-readable storage medium, for resolving ambiguities in date values associated with an attribute of an entity, the computer-readable storage medium comprising:
program code for obtaining a first text string associated with an attribute of an entity, wherein the first text string is extracted from a first web document;
program code for determining that the first text string conforms to one or more date formats;
program code for assigning a first confidence value for each of the date formats for the first text string based on a first number of unknown variables that remain when interpreting the first text string using each of the date formats;
program code for obtaining a second text string associated with the attribute of the entity, wherein the second text string is extracted from a second web document;
program code for determining if that the second text string conforms to one or more of the date formats;
program code for assigning a second confidence value for each of the date formats for the second text string based on a second number of unknown variables that remain when interpreting the second text string using each of the date formats;
program code determining a first date string expressed in a date format with a highest first confidence value for the first text string;
program code determining a second date string expressed in a date format with a highest second confidence value for the second text string; and
program code for merging a first subset of the first date string and a second subset of the second date string to obtain a date value for the attribute.

32. The computer program product of claim 31, the computer-readable storage medium further comprising:
program code for determining whether the obtained date value is consistent with rules related to the attribute.

33. The computer program product of claim 31, the computer-readable storage medium further comprising:
program code for determining whether the first text string is consistent with rules related to the attribute.

34. The computer program product of claim 19, the computer-readable storage medium further comprising:
    program code for determining a threshold number of date formats to be merged to obtain a date value.

35. The computer program product of claim 31, wherein the confidence value for a respective date format is further based on an amount of specificity of the respective date format, the amount of specificity of the respective date format being selected from the group consisting of:
    a number of unknown variables ef-in the respective date format;
    a precision of the respective date format.

36. The computer program product of claim 31, the computer-readable storage medium further comprising: program code for applying a date format for the obtained date value to all text strings that conform to one or more date formats from at least one domain from which the obtained date value was obtained.

37. The computer program product of claim 31, wherein the first text string is interpreted as a range of time.

38. The computer program product of claim 31, wherein the merging of the date formats retains components of the date format for the first text string and components of the date format for the second text string that do not conflict.

39. The computer program product of claim 31, wherein the merging of the date formats retains components of the date format for the first text string and components of the date format for the second text string that are common to both formats.

40. The computer program product of claim 31, wherein the merging of the date formats retains components of the date format for the first text string and components of the date format for the second text string that are not ambiguous.

41. The computer program product of claim 31, wherein a respective text string is obtained from a respective date source, and wherein the computer program product further comprises:
    program code for repeating the program codes of claim 31 until a threshold number of date sources with identical date formats for the attribute are obtained.

42. The computer program product of claim 31, wherein the attribute is a date of birth.

43. The computer program product of claim 31, wherein the program codes are repeated for multiple attributes of one entity.

44. The computer program product of claim 31, wherein one of the date formats is a United States date format.

45. The computer program product of claim 31, wherein one of the date formats is a European date format.

46. A computer-implemented method for resolving ambiguities in date values associated with an attribute of an entity, the method comprising:
    identifying a plurality of web documents associated with an attribute of an entity; for each web document in the plurality of web documents,
        obtaining, from the web document, one or more text strings associated with the attribute of the entity;
        identifying one or more date formats for at least one of the one or more text strings; and
        assigning confidence values to each of the one or more date formats for the at least one of the one or more text strings based on a number of unknown variables that remain when interpreting the at least one of the one or more text strings using each of the one or more date formats;
    determining date strings expressed in date formats with highest confidence values for the at least one of the one or more text strings; and
    merging subsets of the date strings to obtain a date value for the attribute.

47. The method of claim 46, wherein the confidence value for a respective date format is further based on an amount of specificity of the respective date format, the amount of specificity of the respective date format being selected from the group consisting of:
    a number of unknown variables in the respective date format;
    a precision of the respective date format.

48. The method of claim 46, further comprising:
    applying a date format for the obtained date value to all text strings that conform to one or more date formats from at least one domain from which the obtained date value was obtained.

49. The method of claim 46, wherein the merging of the date formats retains components of the date format for the first text string and components of the date format for the second text string that do not conflict.

50. The method of claim 46, wherein the merging of the date formats retains components of the date format for the first text string and components of the date format for the second text string that are common to both formats.

51. The method of claim 46, wherein the merging of the date formats retains components of the date format for the first text string and components of the date format for the second text string that are not ambiguous.

52. The method of claim 46, wherein a respective text string is obtained from a respective date source, and wherein the method further comprises: repeating the operations of claim 24 until a threshold number of date sources with identical date formats for the attribute are obtained.

53. A computer system for resolving ambiguities in date values associated with an attribute of an entity, the computer system comprising:
    one or more processors; memory; and
    one or more programs stored in the memory, the one or more programs comprising instructions to:
    identify a plurality of web documents associated with an attribute of an entity;
    for each web document in the plurality of web documents,
        obtain, from the web document, at least two text strings associated with the attribute of the entity;
        identify one or more date formats for at least two text strings; and
        assign confidence values to each of the one or more date formats for the at least two text strings based on a number of unknown variables that remain when interpreting the at least one of the one or more at least two text strings using each of the one or more date formats;
    determine date strings expressed in date formats with highest confidence values for the at least two text strings; and
    merge subsets of the date strings to obtain a date value for the attribute.

54. The system of claim 53, wherein the confidence value for a respective date format is further based on an amount of specificity of the respective date format, the amount of specificity of the respective date format being selected from the group consisting of:
    a number of unknown variables in the respective date format;
    a precision of the respective date format.

55. The system of claim 53, further comprising instructions to:

apply a date format for the obtained date value to all text strings that conform to one or more date formats from at least one domain from which the obtained date value was obtained.

56. The system of claim 53, wherein the merging of the date formats retains components of the date format for the first text string and components of the date format for the second text string that do not conflict.

57. The system of claim 53, wherein the merging of the date formats retains components of the date format for the first text string and components of the date format for the second text string that are common to both formats.

58. The system of claim 53, wherein the merging of the date formats retains components of the date format for the first text string and components of the date format for the second text string that are not ambiguous.

59. The system of claim 53, wherein a respective text string is obtained from a respective date source, and wherein the system further comprises instructions to:

repeat the instructions of claim 53 until a threshold number of date sources with identical date formats for the attribute are obtained.

* * * * *

UNITED STATES PATENT AND TRADEMARK OFFICE
CERTIFICATE OF CORRECTION

| | | |
|---|---|---|
| PATENT NO. | : 8,239,350 B1 | Page 1 of 1 |
| APPLICATION NO. | : 11/745605 | |
| DATED | : August 7, 2012 | |
| INVENTOR(S) | : Vespe et al. | |

It is certified that error appears in the above-identified patent and that said Letters Patent is hereby corrected as shown below:

In Column 16, line 42, please delete "component;" and add -- components --;

In Column 17, line 17, please delete "if";

In Column 17, line 26, please delete "if";

In Column 18, line 12, please delete "14" and add -- 16 --;

In Column 18, line 44, please delete "if";

In Column 19, line 10, please delete "ef-in" and add -- in --;

In Column 20, line 34, please delete "24" and add -- 46 --;

In Column 20, line 47, please delete "for at" and add -- for the at --;

In Column 20, line 53, please delete "at least one of the one or more".

Signed and Sealed this
Twenty-fifth Day of September, 2012

David J. Kappos
*Director of the United States Patent and Trademark Office*